United States Patent
Hahn et al.

(10) Patent No.: US 7,064,793 B2
(45) Date of Patent: Jun. 20, 2006

(54) METHOD AND APPARATUS FOR MEASURING THE NOISE CONTAINED IN A PICTURE

(75) Inventors: Marko Hahn, Petershagen (DE); Dirk Wendel, Unterhaching (DE); Ulrich Niedermeier, München (DE)

(73) Assignee: Micronas GmbH, Freiburg (DE)

( * ) Notice: Subject to any disclaimer, the term of this patent is extended or adjusted under 35 U.S.C. 154(b) by 282 days.

(21) Appl. No.: 09/859,684

(22) Filed: May 17, 2001

(65) Prior Publication Data

US 2002/0080283 A1 Jun. 27, 2002

(30) Foreign Application Priority Data

May 17, 2000 (DE) ............................. 100 24 374

(51) Int. Cl.
*H04N 17/00* (2006.01)
*H04N 17/02* (2006.01)
*H04N 5/21* (2006.01)
*H04N 5/213* (2006.01)
*H04N 5/217* (2006.01)

(52) U.S. Cl. .................... 348/619; 348/623; 348/180; 382/261

(58) Field of Classification Search ........... 348/180, 348/618, 619, 622, 623; 382/181, 261, 268, 382/269, 227, 274; H04N 17/00, 17/02, 5/21, H04N 5/213, 5/217
See application file for complete search history.

(56) References Cited

U.S. PATENT DOCUMENTS

| | | | | |
|---|---|---|---|---|
| 5,329,311 A | * | 7/1994 | Ward et al. | 348/180 |
| 5,387,946 A | * | 2/1995 | Knee | 348/622 |
| 5,418,574 A | * | 5/1995 | Miyabata et al. | 348/625 |
| 5,425,114 A | * | 6/1995 | Hamasaki et al. | 382/254 |
| 5,635,990 A | * | 6/1997 | Yi | 348/606 |
| 5,844,627 A | | 12/1998 | May et al. | |
| 5,870,502 A | * | 2/1999 | Bonneau et al. | 382/249 |
| 5,969,777 A | * | 10/1999 | Mawatari | 375/240.26 |
| 6,169,583 B1 | * | 1/2001 | Merkl et al. | 348/607 |
| 6,370,279 B1 | * | 4/2002 | Paik | 382/268 |
| 6,377,299 B1 | * | 4/2002 | Hamada | 348/192 |
| 6,496,605 B1 | * | 12/2002 | Osa | 382/268 |
| 6,529,637 B1 | * | 3/2003 | Cooper | 382/267 |
| 6,600,839 B1 | * | 7/2003 | Mancuso et al. | 382/268 |
| 6,633,654 B1 | * | 10/2003 | Hannigan et al. | 382/100 |
| 6,674,903 B1 | * | 1/2004 | Cliquet | 382/199 |
| 6,704,437 B1 | * | 3/2004 | He et al. | 382/128 |

(Continued)

FOREIGN PATENT DOCUMENTS

| | | |
|---|---|---|
| DE | 36 17 827 C2 | 12/1987 |
| DE | 43 41 760 A1 | 6/1995 |
| EP | 0562407 | 9/1993 |

OTHER PUBLICATIONS

Van Rensburg et al., "The measurement of signal to noise ratio of a television broadcast picture", IEEE Transactions on Broadcasting, No. 2, pp. 35–43, Jun. 1991.

*Primary Examiner*—Brian Yenke
(74) *Attorney, Agent, or Firm*—O'Shea, Getz & Kosakowski, P.C.

(57) ABSTRACT

To determine the noise contained in a picture, it is proposed first to determine homogeneous picture regions of the picture (100–102) and then to measure the high-frequency signal component in these homogeneous picture regions (BR). The measurement of the high-frequency signal components is here averaged over many measurement points, i.e. over many homogenous picture regions (BR), and is processed into a noise figure (NOISE_SUM) (103–104). In this way, the quality of the picture can be measured directly in the picture content.

17 Claims, 2 Drawing Sheets

U.S. PATENT DOCUMENTS

| | | | |
|---|---|---|---|
| 6,707,940 B1 * | 3/2004 | Qian | 382/173 |
| 6,728,381 B1 * | 4/2004 | Hosoya | 381/94.1 |
| 6,804,408 B1 * | 10/2004 | Gallagher et al. | 382/272 |
| 6,839,151 B1 * | 1/2005 | Andree et al. | 358/2.1 |
| 6,895,121 B1 * | 5/2005 | Joshi et al. | 382/243 |
| 6,898,329 B1 * | 5/2005 | Takahashi | 382/272 |
| 6,928,196 B1 * | 8/2005 | Bradley et al. | 382/300 |
| 6,973,221 B1 * | 12/2005 | Xue | 382/268 |
| 2001/0055421 A1 * | 12/2001 | Baatz et al. | 382/173 |
| 2002/0039441 A1 * | 4/2002 | Klassen | 382/166 |

* cited by examiner

METHOD AND APPARATUS FOR MEASURING THE NOISE CONTAINED IN A PICTURE

BACKGROUND OF THE INVENTION

The present invention relates to the field of signal processing for television receivers, and in particular to a method and apparatus for measuring the noise contained in a picture image to be displayed.

Noise reduction algorithms are used to improve the quality of noisy pictures. However, such algorithms reduce the picture quality when the noise level is small. It is therefore desirable to adapt the noise reduction algorithm to the degree of noise contained in the particular picture (i.e., in pictures that are not very noisy, only slight corrections should be made, while in pictures with poor quality, stronger corrections should be made). As a result, the noise contained in the picture must be quantified in order to assess the amount of noise reduction to be applied to the picture.

A standard measure for determining picture quality is often referred to as peak signal-to-noise ratio value (PSNR value). However, this measure requires a reference picture that does not include noise.

In the field of television, a known noise reduction technique includes measuring noise in the blanking interval of the respective TV signal (i.e., in those time intervals in which no active picture content is transmitted). Since the blanking interval of the TV signal is increasingly used for digital services (e.g., to transmit video text information) this technique is no longer available. This problem becomes even more severe since the digital services that use the blanking interval of the TV signal differ from country-to-country.

Therefore, there is a need for an apparatus and method for measuring the noise contained in a picture that does not depend on the blanking interval.

SUMMARY OF THE INVENTION

To be able to measure the picture quality directly in the picture content, the noise must be separated from the picture content, so that the information about the noise contained in the picture is not garbled by the structures contained in the picture. The noise contained in the picture can be quantified, for example, in the form of a noise figure.

The invention achieves this by first finding homogenous picture areas which have little structure. These homogeneous areas can be, for example, a nearly monotone picture background (e.g., a blue sky). Subsequently, the high-frequency signal component in these homogenous picture areas is measured. The measurements are preferably averaged over several measurement points or over several successive pictures (e.g., in the TV application), so as to finally obtain quantitative information about the noise.

The operations for determining the homogeneous picture area as well as for measuring the high-frequency signal components are performed especially in terms of lines (i.e., the required accesses to the measurement data can occur line-by-line, corresponding to the scanned and digitized TV signal). The steps for determining the homogeneous picture areas as well as for measuring the high-frequency signal component are matched to one another, which facilitates implementing the present invention in hardware.

The homogeneous picture area is preferably determined by evaluating the luminance values of the individual pixels of the particular picture under consideration. For this purpose the picture can be divided into several adjoining blocks, which have several horizontally adjoining pixels. In one embodiment, the present invention evaluates picture areas that have five blocks, each with five horizontally adjoining pixels.

For each block, the DC component can be determined by a (1,1,1,1,1)-filter. If the difference between the maximum DC component and the minimum DC component of the five horizontal adjoining picture blocks lies within a given tolerance limit, this picture area, with a total of 25 pixels, can be regarded as homogeneous.

If a picture area has been recognized as homogeneous in this fashion, the high-frequency signal component can be calculated for each block of this picture area, for example by using a (1,−2,2,−2,1)-filter. The high-frequency signal components of the individual blocks of the homogeneous picture area are added up, so that finally the sum of these high-frequency signal components provide quantitative information about the noise contained in the particular picture under consideration, in the form of a noise figure.

In the embodiment that operates on the five blocks, each with five adjoining pixels, the calculation of the DC components and of the high-frequency signal components requires five clock cycles. Consequently, the data flow can be designed without wait cycles. Of course, the present invention is not limited to the procedure that processes picture areas with five blocks, each with five horizontally adjoining pixels. The width of the blocks (i.e., the number of pixels contained in each block) should not be too small, so as to make possible a reasonable statement about the existing DC component and the high-frequency signal component. On the other hand, the blocks should not be too large, since otherwise only very large homogenous picture areas can be used in the particular picture for measuring the noise. The subdivision of the picture into blocks of five horizontally adjoining pixels has turned out to be advantageous inasmuch as, in this case, an easily implemented high-pass filter (with only bit-shift operations) can be used to measure the high-frequency signal components, thus yielding good properties in frequency response.

In an alternative embodiment, the differences of the luminance values of two successive picture lines can also be used as input data for the inventive processing technique, rather than the luminance values of the individual pixels. An advantage of this technique is that the picture content is suppressed, since the formation of differences suppresses/filters-out vertical structures so that they cannot influence the noise figure. In addition, when using this technique, more homogeneous picture areas can be found, thus increasing the reliability of the information obtained about the noise contained in the picture, since the average covers a larger number of measurement data.

The output variable of the present invention in principle can be a single number that represents the noise (averaged over an adjustable region). However, information can also be made available about the position of the homogeneous picture areas contained in the picture. This information can be used for subsequent noise reduction, since the noise in non-homogeneous picture areas with an intensive structure is better concealed, and noise reduction at these points may lead to a garbling of the picture content.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
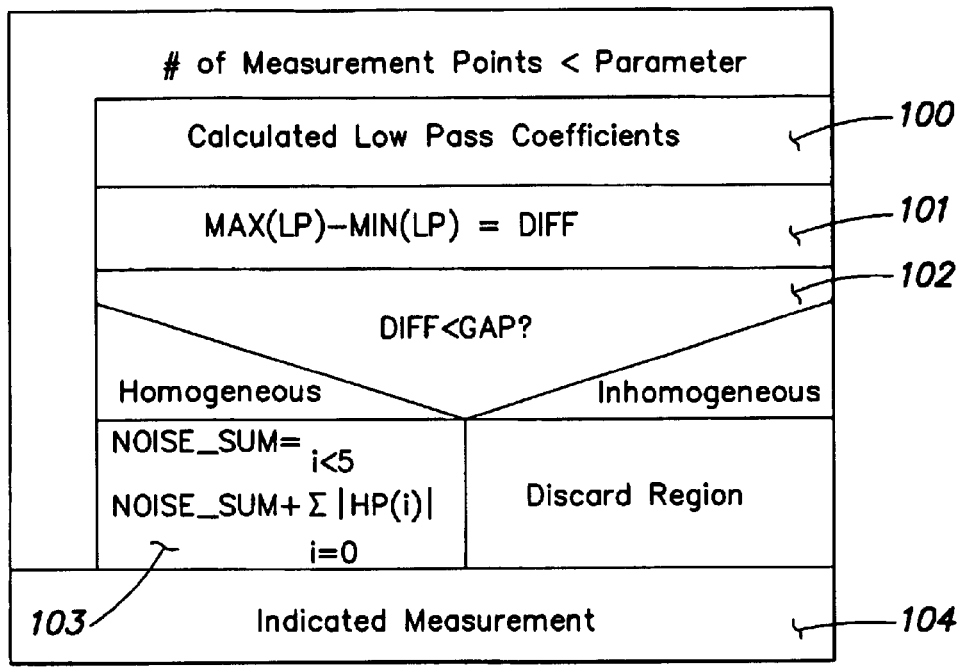
FIG. 1 is a flowchart illustration of a technique for measuring the noise contained in a picture in accordance with a preferred embodiment of the present invention.

FIG. 1 is a flowchart illustration of a technique for measuring the noise contained in a picture in accordance with a preferred embodiment of the present invention. The method includes a step sequence 100–104, which is preferably traversed several times in succession, until a number of measurement points defined by an appropriate parameter have been processed. The steps 100–102 determine homogeneous picture areas. In particular, the picture luminance values assigned to each individual pixel are evaluated block-by-block, such that in one embodiment five adjoining picture blocks, each with five pixels, are always considered. The picture data are processed line-by-line. In step 100 an appropriate low-pass coefficient value LP is determined for each block. Then, in step 101, the difference value DIFF indicative of the maximum DC component and the minimum DC component of the blocks contained in the picture area under consideration is determined. Step 102 determines whether the difference value DIFF is within a prescribed and preferably adjustable tolerance limit value GAP. If it is not, the picture area is regarded as inhomogeneous and is discarded for calculating the noise figure. On the other hand, if the calculated difference value DIFF is less than the prescribed tolerance value GAP, the picture area under consideration is regarded as homogeneous.

In step 103, the high-frequency signal component in the corresponding picture signal is calculated for this homogeneous picture area. A high-pass coefficient value HP is calculated by a filter for each block of the picture area under consideration, and the individual high-pass coefficients are summed up. The resulting sum value NOISE_SUM is indicated as the noise in step 104, and provides quantitative information about the noise contained in the particular picture under consideration. The method is repeated for the next homogeneous picture area of the same picture or for a successive picture, until a desired number of measurement points has been reached.

The method described above will be explained in more detail with reference to FIG. 2. The embodiment described below is especially advantageous for implementing the noise measuring technique in the hardware, since no wait cycles occur in the data flow.

Figure 2:
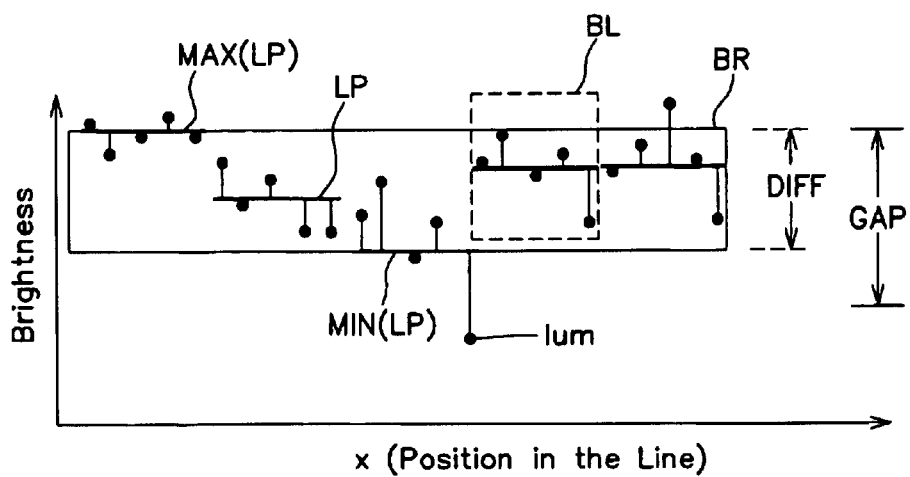
FIG. 2 is a pictorial illustration of the method shown in FIG. 1.

FIG. 2 illustrates several horizontally adjoining pixels with the brightness or luminance value associated with each pixel. As already mentioned above, the picture data are processed line-by-line (i.e., the pixels shown in FIG. 2 are situated in the same picture line of the picture under consideration).

The picture is subdivided into several blocks BL, with every block BL having a certain number of horizontally adjoining pixels. In the example illustrated in FIG. 2, each block BL includes five pixels. For each of these blocks, the DC component (i.e., the average of the luminance values of the pixels contained therein) is calculated by a (1,1,1,1,1)-filter. That is, for each block BL a low-pass coefficient LP is calculated by the following relation:

$$LP(x', y) = \sum_{i=0}^{4} lum(i + 5x', y) \quad \text{(EQ. 1)}$$

LP(x',y) designates the low-pass coefficient of the block with block coordinates (x',y), while lum(x,y) designates the luminance value of the pixel with the pixel coordinates (x,y). The block with the block coordinates (0,y) contains the pixels with pixel coordinates (0,y), (1,y), (2,y), (3,y), and (4,y). The block with the block coordinates (1,y) contains the pixels with the pixel coordinates (5,y), (6,y), (7,y), (8,y), and (9,y), etc.

By evaluating the low-pass coefficients calculated in this manner, homogeneous picture areas can be detected. In this process, picture areas BR are investigated that contain five adjoining picture blocks BL (compare FIG. 2), so that five successive low-pass coefficients LP are evaluated.

In the picture region BR under consideration, the maximum low-pass coefficient MAX(LP) (i.e., the maximum DC component of the blocks BL contained in this picture region BR) and the minimum low-pass coefficient MIN(LP) (i.e., the minimum DC component of the picture blocks BL contained in the picture region BR under consideration) are determined and the difference value DIFF=MAX(LP)−MIN(LP) are calculated. If the difference value DIFF is less than a given tolerance limit GAP, this picture region BR including 25 pixels is regarded as homogeneous and will be used for the measurement of the high-frequency signal component, which will be discussed in more detail later.

The tolerance limit value GAP is preferably adjustable. A stringent (i.e., narrower) tolerance limit makes the measurement more reliable, but on the other hand fewer homogeneous picture areas will be found, over which an average can be taken. Furthermore, a narrower tolerance limit makes the display of the measurement result slower for a given set of measurement points.

If a picture region BR has been recognized as homogeneous in step 102 (FIG. 1), the high-frequency signal component of the corresponding picture signal contained within this picture region is calculated in step 103 (FIG. 1). The high-frequency signal component of each block BL of the homogeneous picture region BR is preferably calculated with a (1,−2,2,−2,1)-filter in the form of a corresponding high-pass coefficient HP as follows:

$$HP(x'y)=lum(5x',y)-2lum(1+5x',y)+2lum(2+5x',y)-2lum(3+5x',y)+lum(4+5x',y) \quad \text{(EQ.2)}$$

HP(x',y) designates the high-frequency signal component or the high-pass coefficient of the block BL with the block coordinates (x'y), while lum(x,y) designates the luminance value of the pixel with pixel coordinates (x,y). The high-pass coefficients HP calculated for the individual blocks BL in this manner are summed in step 103 (FIG. 1) to form the noise value NOISE_SUM illustrated in FIG. 1.

Since both the calculation of the low-pass coefficients LP and the determination of the homogeneity criterion, as well as the calculation of the high-pass coefficients HP require five clock cycles in this embodiment, the data flow can be designed without wait cycles. The width of the blocks BL need not necessarily comprise five pixels. However, the width should not be chosen too small, in order to ensure reasonable information about the DC component and the high-frequency signal component is computed. On the other hand, the width of the blocks should not be chosen too large since only very large homogeneous picture regions in the picture can be used for measuring the noise. If blocks containing five horizontally adjoining pixels are used, the high-pass filter needed to calculate the high-frequency signal component can be implemented simply by bit-shift operations.

In the embodiment described above, it was assumed that picture regions BR contain five blocks BL, each with five horizontally adjoining pixels. However, homogeneous picture regions with more than 25 pixels are also possible. For example, if the block with coordinates (x'+5,y) meets the homogeneity criterion with the preceding four blocks, this block is also evaluated, so that a homogeneous picture region with more than 25 pixels results.

In the description of the above embodiment, it was assumed that the calculation of the low-pass coefficient LP and the calculation of the high-pass coefficient HP are performed by evaluating the luminance values associated with the individual pixels. In an alternative embodiment, the difference values of the luminance values of two successive picture lines can also be used. In this alternative technique for measuring noise, the picture content is suppressed by the formation of the difference, since the vertical structures are filtered out. Furthermore, with this procedure more homogeneous picture regions can be found, so that an average can be taken over a larger number of measurement data.

Even with non-noisy pictures the sum of the high-pass coefficients will not yield exactly the value zero. Consequently, prior to executing the technique illustrated in FIG. 1, the zero-point error should be found (i.e., the deviation of the sum from zero for a non-noisy picture). This zero-point error can then be compensated in measurements of noisy pictures by an appropriate offset value.

In the technique described above, the number of investigated picture regions can be adjusted after the measurement (i.e., the noise figure NOISE_SUM) is to be indicated. A quick indication has the result that pictures whose structure can falsify the measurement can be weighted more heavily. Also, by another parameter, the sensitivity of the measurement can be adjusted in the sense that, by an appropriate choice of this parameter, one can prescribe the noise intensity at which a full amplitude is to be indicated. Furthermore, by adjusting an appropriate parameter, the dependence between the number of measurement points found in a particular case and the size of the tolerance range can be counteracted. If only a few measurement points per picture (i.e., a small number of homogeneous picture regions) are determined, the tolerance limit value GAP can be increased by a certain value, to permit the determination of the high-frequency signal component of such picture regions as would have been classified as non-homogeneous with the original tolerance limit value GAP. The tolerance limit value GAP can also be changed through several steps, such that the value by which the tolerance limit value GAP is changed depends on the particular number of homogeneous picture regions that are detected.

Figure 3:
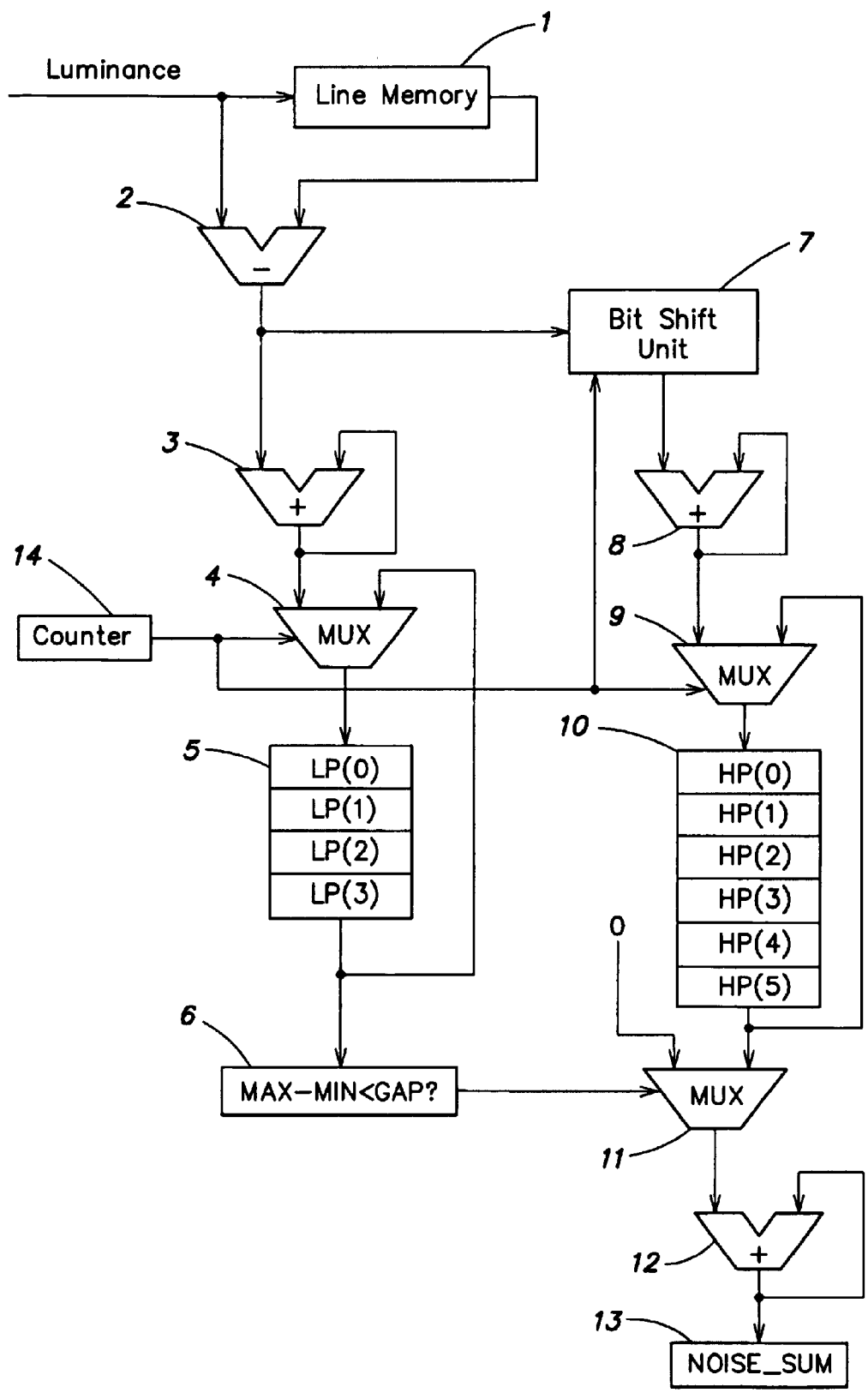
FIG. 3 is a block diagram of a circuit for measuring the noise contained within a picture.

FIG. 3 is a block diagram illustration of a circuit for measuring the noise within a picture. In particular, a circuit for the embodiment working with line differences is shown. The luminance values of the individual pixels are input to a line memory 1 and stored. The luminance values are also input to a subtractor 2, which receives from the line memory 1 the luminance value of the corresponding pixel of the immediately adjoining picture line and calculates the differ-ence luminance value. The difference luminance value from the subtractor 2 is input to the circuit sections 3–6 that calculate the DC components and the low-pass coefficients, as well as the circuit sections 7–13 that determine the high-frequency signal components (i.e., the high-pass coefficients). If the inventive technique described above is to be performed without forming the line differences, the circuit sections 1 and 2 can be omitted. In this case, the direct luminance values are input to the circuit sections 3–6 and 7–13.

The input values found in this manner are conducted to an adder 3 that include feedback through a register which is not shown. The adder 3 performs the summation to find the DC component. A counter 14 in combination with a multiplexer 4 assures that after every five clock cycles (in this embodiment), a new summation value is written as a new low-pass coefficient into a four-stage shift register 5. Through the four stages of the feedback shift register 5, the low-pass coefficients LP of the last five blocks are conducted to an evaluation unit 6, which calculates the difference between the maximum low-pass coefficient and the minimum low-pass coefficient of the picture region under consideration, and compares this with the prescribed tolerance limit value GAP. If this difference is less than the tolerance limit value GAP, another multiplexer 11 is actuated. This multiplexer 11 is part of the circuit section for determining the high-pass coefficients.

The input values (i.e., the luminance values or the difference luminance values) are input to a bit-shift unit 7, which together with a series-connected adder 8, fed back through a register that is not shown, implements the previously described (1,−2,2,−2,1)-filter. Multiplexer 9 together with the counter 14 ensures that the output signal of the adder 8 is accepted after every five clock cycles and is conducted to a six-stage, fed-back shift register 10. Through the six stages of the shift register 10, the high-pass coefficients HP of the last seven blocks are always available. If the evaluation unit 6 recognizes that the picture region under consideration is homogeneous, the multiplexer 11 is actuated in such a way that the high-pass coefficients corresponding to this picture region, which up to now were stored in the shift register 10 or in the corresponding queue, are conducted to a series-connected adder 12, which is fed back through a register that is not shown, and are added to the current value of the noise figure NOISE_SUM. However, if no appropriate control signal of the output unit 6 is present, the multiplexer 11 outputs the value "0" and thus does not change the noise figure. After the process is completed, an indicator unit 13 outputs the noise figure NOISE_SUM, which is a quantitative measure of the noise contained in the picture under consideration.

According to FIG. 3, the shift register 5, in contrast to the shift register 10, is designed with only four stages, to make possible early detection of the homogeneous picture regions.

For the sake of simplicity, FIG. 3 does not illustrate any circuit sections that can be provided to normalize the noise figure NOISE_SUM (i.e., the noise figure is divided by the number of measurements) or to adjust the previously described parameters, although it is contemplated that such normalization and/or adjustments may be included with the noise detection technique of the present invention.

Although the present invention has been shown and described with respect to several preferred embodiments thereof, various changes, omissions and additions to the form and detail thereof, may be made therein, without departing from the spirit and scope of the invention.

What is claimed is:

1. A method for measuring the noise in a picture that includes a plurality of lines, comprising:

receiving a digital picture signal that includes a plurality of pixels indicative of the picture;

subdividing a line of said digital picture signal into several blocks (BL), each with several horizontally adjoining pixels, wherein a picture region (BR) includes a plurality of said blocks (BL) and the number of said blocks contained within said picture region (BR) corresponds to the number of pixels contained in each block (BL);

determining a luminance DC component value for each of picture blocks;

processing for said picture region, said luminance DC component values associated with each of a plurality of blocks within said picture region, by comparing each of said luminance DC components to a minimum threshold value and a maximum threshold value, to detect at least one homogeneous picture region (BR) within the picture;

determining a high frequency component (HP) within said at least one detected homogeneous picture region (BR);

processing said high-frequency signal component (HP) to determine the noise contained in the picture and providing a noise signal indicative thereof; wherein said luminance DC component of each block (BL) is determined by the following relation $$LP(x', y) = \sum_{i=0}^{n} lum(i + nx', y),$$

where LP designates the luminance of DC component of the corresponding block (BL), (x',y) designates the position of the corresponding block (BL) in the picture, lum designates the luminance value or the difference luminance value of the corresponding pixel, and n designates the number of horizontally adjoining pixels contained in the corresponding block (BL);

wherein each block (BL) contains five horizontally adjoining pixels, and for each block (BL) of the picture region (BR) which is recognized as homogeneous, a high frequency signal component (HP) is determined by the following relation $HP(x',y)=lum(5x',y)-2lum(1+5x',y)+2lum(2+5x',y)-2lum(3+5x',y)+lum(4+5x',y),$ where HP designates the coefficient of the corresponding block (BL), (x',y) designates the position of the corresponding block (BL) in the picture, and lum designates the luminance value or the difference luminance value of the respective pixel.

2. A method for measuring the noise contained in a picture, by which the picture is described by an appropriate picture signal, comprising:

receiving a picture signal and processing said picture signal to detect at least one homogeneous picture region (BR) of the picture;

for the at least one detected homogeneous picture region (BR), measuring a high-frequency signal component (HP) contained in said picture signal; and determining the noise contained in the picture from the high-frequency signal component (HP) and providing a noise signal indicative thereof.

3. A method for measuring the noise contained in a video picture, comprising:

receiving a video picture signal and processing said video picture signal to detect at least one homogeneous picture region of the picture;

for the at least one detected homogeneous picture region, measuring a high-frequency signal component contained in said video picture signal; and determining the noise contained in the picture from the high-frequency signal component and providing a noise signal indicative thereof.

4. The method of claim 3, wherein said step of processing said video picture signal to detect said at least one homogeneous picture region of the picture includes filtering said video picture signal in a (1,1,1,1,1) filter.

5. The method of claim 3, wherein said step of measuring a high-frequency signal component contained in said video picture signal includes filtering said homogeneous picture region using a (1,−2,2,−2,1) filter.

6. The method of claim 3, wherein said step of processing said video picture signal to detect at least one homogeneous picture region of the picture includes processing a block of pixels comprising a plurality of horizontally adjoining pixels.

7. A method for measuring noise contained in a video picture that includes a plurality of regions, comprising:

processing said video picture region-by-region, wherein each region includes a plurality of blocks and each of the blocks includes a plurality of adjacent pixels;

processing each region to determine if the region is a homogeneous region;

for at least one detected homogeneous region of the picture, on a block-by-block basis determining a high-frequency signal for each block associated with the homogeneous region of the picture and providing a high-frequency signal indicative thereof; and determining the noise contained in the picture from the high-frequency signals and providing a noise signal indicative thereof.

8. The method of claim 7, wherein said step of processing each region to determine if the region is a homogeneous region includes filtering each block of the region in a (1,1,1,1,1) filter, and said step of determining a high-frequency signal includes filtering each block of the detected homogeneous picture region using a (1,−2,2,−2,1) filter.

9. The method of claim 7, wherein each block of pixels comprises a at least five adjacent pixels.

10. The method of claim 7, wherein said step of processing a video picture to detect at least one homogeneous region of the picture comprises:

for each region, processing the blocks within the region to calculate the average of the pixel luminance values contained within the block and providing an average block luminance signal value for each of the blocks in the region;

processing the average block luminance signal values for the blocks in the region, to determine the maximum average block luminance signal value and the minimum average block signal value in the region;

computing the difference between the maximum average block luminance signal value and the minimum average block luminance signal value and providing a difference signal indicative thereof; and comparing said difference signal to a threshold value to determine if the region is homogeneous.

11. The method of claim 7, wherein said step of determining a high frequency signal comprises:

filtering each block of the homogeneous region in a (1,−2,2,−2,1) filter to provide a high pass signal for each block in the homogeneous region; and summing the high pass signals associated with each block in the region to provide a signal indicative of said noise signal.

12. An apparatus that measures noise contained in a video picture that includes a plurality of regions, wherein each region includes a plurality of blocks and each of the blocks includes a plurality of adjacent pixels, said apparatus comprising:

means for processing each region to determine if the region is a homogeneous region;

means for determining a high-frequency signal for each block associated with the detected homogeneous region of the picture and for providing a high-frequency signal indicative thereof; and means for determining the noise contained in the picture from the high-frequency signals and for providing a noise signal indicative thereof.

13. The apparatus of claim 12, wherein said means for processing each region to determine if the region is a homogeneous region includes processing a block of pixels comprising at least five horizontally adjoining pixels.

14. The apparatus of claim 12, wherein each of said pixels includes an associated luminance value, and said means for processing each region to determine if the region is a homogeneous region includes a circuit that calculates the average of the pixel luminance values contained within the block of pixels.

15. The apparatus of claim 12, wherein each of said pixels includes an associated luminance value, and said means for processing comprises a low-pass digital filter.

16. The apparatus of claim 12, wherein said means for processing comprises:

means for processing the blocks within each region to calculate the average of the pixel luminance values contained within the block and providing an average block luminance signal value for each of the blocks in the region;

means for processing the average block luminance signal values for the blocks in the region, to determine the maximum average block luminance signal value and the minimum average block luminance signal value in the region;

means for computing the difference between the maximum average block luminance signal value and the minimum average block luminance signal value and providing a difference signal indicative thereof; and means for comparing said difference signal to a threshold value to determine if the region is homogeneous.

17. The apparatus of claim 12, wherein said means for processing comprises:

a low-pass filter that calculates the average of the pixel luminance values contained within each block of the homogenous region and provides an average block luminance signal value for each of the blocks in the region;

a comparator circuit that determines the maximum average block luminance signal value and the minimum average block luminance signal value in the region;

a difference circuit that computes the difference between the maximum average block luminance signal value and the minimum average block luminance signal value and provides a difference signal indicative thereof; and comparator responsive to said difference signal and a threshold value, that provides a signal indicative of whether or not the region is homogeneous.

* * * * *

UNITED STATES PATENT AND TRADEMARK OFFICE
CERTIFICATE OF CORRECTION

PATENT NO. : 7,064,793 B2  Page 1 of 1
APPLICATION NO. : 09/859684
DATED : June 20, 2006
INVENTOR(S) : Hahn et al.

It is certified that error appears in the above-identified patent and that said Letters Patent is hereby corrected as shown below:

In the Abstract
Delete the Abstract and insert: "A technique for measuring noise contained in a video picture includes receiving a video picture signal and processing the video picture signal to detect at least one homogeneous picture region of the picture. For the at least one detected homogeneous picture region, a high-frequency signal component contained in the video picture signal is measured. The noise contained in the picture is determined from the high-frequency signal component and a noise signal is provided indicative thereof."

Column 1
line 48, delete "homogenous" and insert --homogeneous--
line 52, delete "homogenous" and insert --homogeneous--
line 62, delete "homogenous" and insert --homogeneous--

Column 2
delete "homogenous" and insert --homogeneous--

Column 7
In the claims, claim 1, line 14, before "picture", insert --said--
In the claims, claim 1, line 35, before "DC", delete "of"

Signed and Sealed this

Fifteenth Day of August, 2006

JON W. DUDAS
*Director of the United States Patent and Trademark Office*